Feb. 16, 1965    F. W. PASS    3,169,270
KNEADER

Filed May 6, 1963    2 Sheets-Sheet 1

INVENTOR
Friedrich Wilhelm Pass
BY Michael S. Striker
Attorney

Feb. 16, 1965  F. W. PASS  3,169,270
KNEADER
Filed May 6, 1963  2 Sheets-Sheet 2
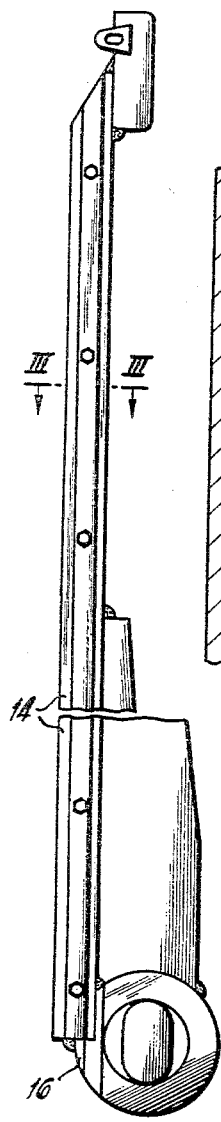
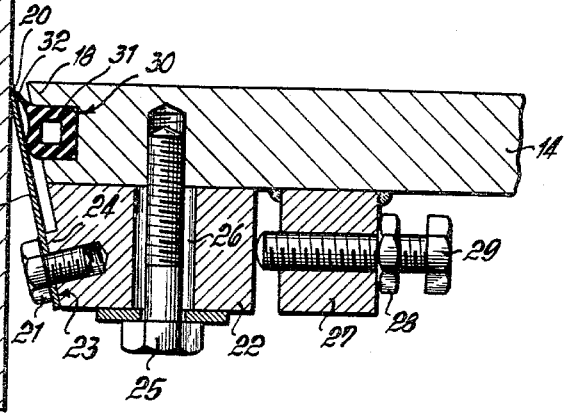
INVENTOR
Friedrich Wilhelm Pass
BY Michael S. Striker
Attorney United States Patent Office 3,169,270
Patented Feb. 16, 1965

3,169,270
KNEADER
Friedrich Wilhelm Pass, Schwelm, Westphalia, Germany, assignor to Gummiwerk Pass & Sohn, Schwelm, Westphalia, Germany, a firm
Filed May 6, 1963, Ser. No. 278,120
Claims priority, application Germany, June 14, 1962, G 35,203
9 Claims. (Cl. 18—2)

This invention relates to kneaders, and more specifically to a kneader with a charging space for the material to be worked, composed particularly of rubber and filling substances and to be pressed against kneading tools, the charging space being provided with a charging flap guided between boundary walls formed by lateral extensions of the charging space.

In a known kneader the side edges of the charging flap are provided with brass strips or the like. Since the material to be worked tends to stick and harden and leave unevennesses on the boundary walls, there is a danger of leakage. Through the internal pressure in the charging chamber or space the dusty material, primarily the soot, is forced out with the result that the workroom becomes very dusty and can be injurious to the health of the operators.

The object of the invention is to produce a kneader of the type described at the outset, which is free from such objections. This object is attained according to the invention by providing a kneader which comprises a charging space for the material to be worked composed particularly of rubber and filling substances, kneading tools against which the material to be worked is to be pressed, boundary walls forming lateral extensions of the charging space, a hinged charging flap guided between the extensions of the charging space, and sealing blades mounted on the side edges of the charging flap at an acute angle to the boundary walls and directed towards the charging space, said sealing blades having sharpened edges adapted to bear tightly against said boundary walls. As a result the sealing blades will slide during the closing of the charging flap with their sharpened but stoned edges on the boundary walls and thereby scrape off any material sticking on the boundary walls due to its adhesiveness, without damaging the metal surfaces. The sharpened edges of the sealing blades thus always bear smoothly along their entire lengths against the boundary walls so that a tight seal is obtained.

The sealing blades are preferably fixed on bars which have projections forming supporting surfaces for the sealing blades. As a result the sealing blades are fixed on the bars only in the region of their backs so that the sealing blades can bear with their sharpened edges with pre-tension against the boundary walls.

The bars are preferably laterally adjustably mounted on the charging flap. As a result the sealing blades can be adjusted so as to compensate for the wear caused by sliding on the boundary walls.

Preferably setscrews extending through ribs on the charging flap and fixable by counter nuts are provided for cooperation with the bars which are secured on the charging flap by screws passing through elongated holes in the bars. Thus, the bars carrying the sealing blades are secured to the charging flap by simple and cheap means allowing lateral adjustment of the bars.

The charging flap is expediently provided on its side edges with grooves in which rubber packings in the form of sectional tubes are fitted and extend up against the sealing blades. As a result the gap between the sealing blades and the boundary walls is sealed, the rubber packings being preferably provided with longitudinally extending lips which bear against the sealing blades.

A preferred embodiment of the invention will now be described by way of example and with reference to the accompanying drawings, in which:

FIG. 2 is a side elevational view, on a larger scale and partly broken away, showing the charging flap of the kneader, and FIG. 3 is a cross section on a still larger scale taken on the line III—III of FIG. 2.

Figure 1:
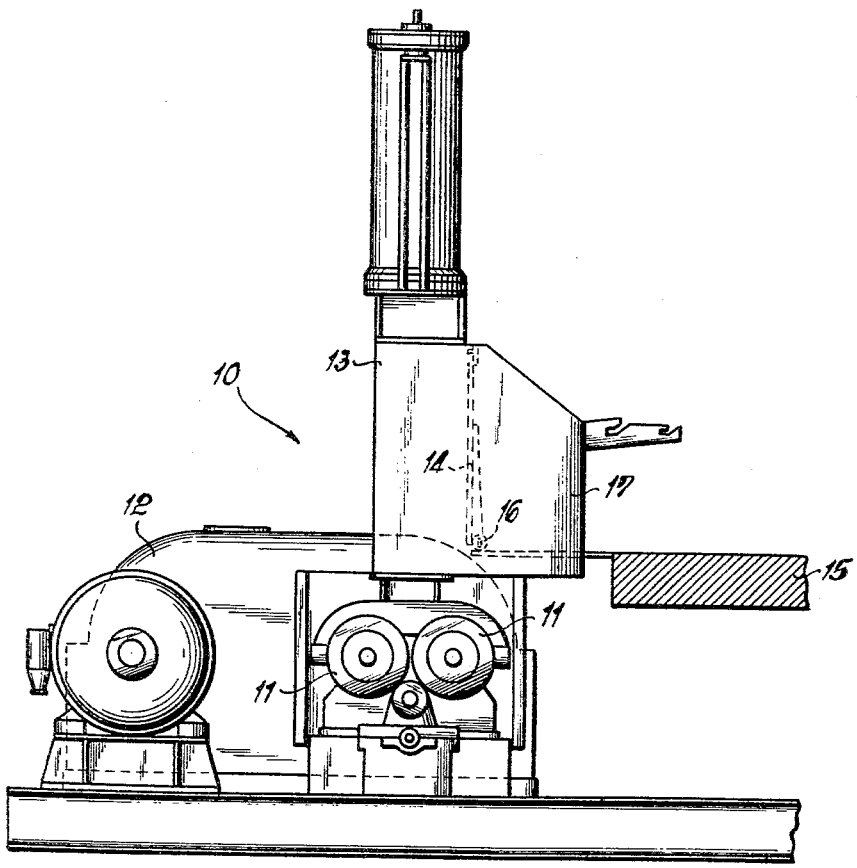
FIG. 1 is a side elevational view of a kneader for rubber or the like according to the invention.

FIG. 1 shows a kneader 10 for rubber or the like which is provided with kneading tools such as two heatable profiled rolls 11 which can be driven by a driving aggregate 12. By the rolling operation the rubber or the like is made soft and pliable, filling substances in the form of soot, sulphur and the like being simultaneously mixed therein. A charging space 13 for the rubber or the like and the filling susbtances is provided above the rolls 11. This charging space 13 forms at the same time the cylinder for a ram, not shown in the drawings, which can be actuated by a piston arranged above the charging space 13 and by which the rubber or the like and the filling substances are pressed between the rolls 11. During the rolling operation the ram is in its lower extreme position.

The charging space 13 is provided with a charging flap 14 which can be opened for charging the kneader 10. When the charging flap 14 is open the rubber or the like and the filling substances can be filled into the charging space 13. The charging flap 14 is hinged at its horizontal lower edge 16 so that it can be set at an incline during the charging operation.

As can be seen from FIG. 1, the charging space 13 has in the region of the charging flap 14 boundary walls 17 forming lateral extensions of the charging space 13 between which the chargin flap 14 slides when being opened and closed. The charging operation is thereby facilitated since the material to be worked has only to be filled into the charging space 13 and onto the charging flap 14 between the two boundary walls 17. When the charging flap 14 is closed the material introduced is then pressed by the ram into the chamber accommodating the rolls 11.

As already mentioned, the material consisting of rubber or the like and filling substances is pressed towards the rolls 11 by the ram during the charging operation. As shown particularly in FIG. 3, the charging flap 14 has side edges 18 and to prevent the material from being blown out at these side edges 18, the same are provided with sealing blades 19. The sealing blades 19 have sharpened but stoned edges 20 and with these edges they bear under pre-tension against the boundary walls 17 to which they are set at an acute angle. The sealing blades 19 therefore extend with their sharpened edges 20 in the closing direction of the charging flap 14 so that, when the charging flap 14 is being closed, the sealing blades 19 slide with their sharpened edges 20 on the boundary walls 17 and thereby scrape off these walls any material which tends to stick and harden thereon. Thus, the sharpened edges 20 of the sealing blades 19 will always bear smoothly along their entire lengths against the boundary walls 17 and form a tight seal.

The sealing blades 19 are fixed on bars 22 by means of several screws 21. These bars 22 are provided with projections 24 having supporting surfaces 23 for the sealing blades 19, the supporting surfaces 23 extending at an acute angle towards the boundary walls 17. The sealing blades 19 are therefore only in the region of their backs fixed on the bars 22 so that they bear with their sharpened edges 20 against the boundary walls 17 under pre-tension. The bars 22 are fixed with screws 25 on the charging flap 14, the screws 25 passing through elongated holes 26 in the bars 22. These bars 22 are consequently laterally adjustable. For adjusting the bars 22 ribs 27 are welded on to the charging flap 14 and setscrews 29 are screwed into the ribs 27 and can be fixed by counter nuts 28. The setscrews 29 bear with their free ends against the bars 22 so that, after the screws 25 have been loosened, the bars 22 can be shifted in the direction towards the boundary walls 17.

As shown in FIG. 3 in particular, the charging flap 14 is provided on its side edges 18 with grooves 30 in which rubber packings 31 in the form of sectional tubes are arranged. These rubber packings 31 seal the gap between the sealing blades 19 and the side edges 18 of the charging flap 14. Each of the rubber packings 31 is provided with a longitudinally extending lip 32 which bears against the respective sealing blade 19 in such a way that the free space located behind the sealing blade is protected against fouling. For cleaning and inserting fresh sectional tubes the bars 22 with the sealing blades 19 can be removed by loosening the screws 25.

I claim:

1. A kneader comprising a charging space for the material to be worked composed particularly of rubber and filling substances; kneading tools against which the material to be worked is to be pressed; boundary walls forming lateral extensions of the charging space; a hinged charging flap guided between the extensions of the charging space, said charging flap being provided with grooves at the side edges thereof; sealing blades mounted on the side edges of the charging flap at an acute angle to the boundary walls and directed towards the charging space, said sealing blades having sharpened edges adapted to bear tightly against said boundary walls; and an elongated tubular rubber packing located in each of said grooves, respectively, of said charging flap and provided with a longitudinally extending lip bearing against the respective sealing blade.

2. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively; sealing blades, each having a free edge portion; and mounting means for mounting said sealing blades on said charging flap with said free edge portion thereof projecting beyond said side edges of said charging flap towards said boundary walls, said mounting means being constructed so that said free edge portions of said sealing blades are permanently biased against said boundary walls, thus assuring proper sealing and scraping contact during the entire turning movement of said charging flap.

3. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively; sealing blades, each having a free edge portion; and mounting means for mounting said sealing blades on said charging flap with said free edge portions thereof projecting beyond said side edges of said charging flap towards said boundary walls, said mounting means including means for adjusting the position of the same relative to said side edges, respectively, of said charging flaps so that said free edge portions of said sealing blades are permanently biased and forced under an acute angle against said boundary walls, thus assuring proper sealing and scraping contact during the entire movement of said charging flap.

4. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively; sealing blades, each having a free edge portion; mounting means for mounting said sealing blades on said charging flap with said free edge portions thereof projecting beyond said side edges of said charging flap towards said boundary walls, said mounting means including means for adjusting the position of the same relative to said side edges, respectively, of said charging flap so that said free edge portions of said sealing blades are permanently biased and forced under an acute angle and under tension against said boundary walls, thus assuring proper sealing and scraping contact during the entire turning movement of said charging flap; and elongated resilient sealing means mounted on said opposite side edges of said charging flap, respectively, and contacting said free edge portions of said sealing blades for preventing passage of material between said sealing blades and said side edges of said charging flap.

5. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively, and having a rear face facing away from said charging space; sealing blades, each having a free edge portion; mounting means for mounting said sealing blades on said charging flap with said free edge portions of said sealing blades projecting beyond said side edges of said charging flap towards said boundary walls, said mounting means including a pair of elongated bars, respectively, fixed to said rear face of said charging flap adjacent said side edges thereof, each of said bars having an elongated projection extending laterally beyond the respective side edge of said flap; and means for fastening said sealing blades to said projections of said bars, respectively, so that said free edge portions of said sealing blades are permanently biased against said boundary walls, thus assuring proper sealing and scraping contact during the entire turning movement of said charging flap.

6. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively, and having a rear face facing away from said charging space; sealing blades, each having a free edge portion; mounting means for mounting said sealing blades on said charging flap with said free edge portions of said sealing blades projecting beyond said side edges of said charging flap towards said boundary walls, said mounting means including a pair of elongated bars, respectively, laterally adjustably attached to said rear face of said charging flap adjacent said side edges thereof, each of said bars having an elongated projection extending laterally beyond the respective side edge of said flap; and means for fastening said sealing blades to said projections of said bars, respectively, so that said free edge portions of said sealing blades are permanently biased against said boundary walls, thus assuring proper sealing and scraping contact during the entire turning movement of said charging flap.

7. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively, and having a rear face facing away from said charging space; sealing blades, each having a free edge portion; mounting means for mounting said sealing blades on said charging flap with said free edge portions of said sealing blades projecting beyond said side edges of said charging flap towards said boundary walls, said mounting means including a pair of elongated bars, respectively, formed with laterally extending elongated slots and said mounting means including lock screws passing through said elongated slots and threadedly connected to said charging flap for fixing said bars respectively to said rear face of said charging flap adjacent said side edges thereof, each of said bars having an elongated projection extending laterally beyond the respective side of said flap; adjusting means for laterally adjusting the position of said bars relative to said side edges of said charging flap, said adjusting means including a pair of ribs located respectively at the rear face of said charging flap adjacent said elongated bars and spaced further away from the respective side edge of said charging flap than said respective elongated bar, lock nut means cross secting and threadedly connected with said ribs, respectively, and bearing against said adjacent bar for laterally adjusting the position of said elongated projections of said elongated bars relative to the respective side edge of said flap; and means for fastening said sealing blades to said projections of said bars, respectively, so that said free edge portions of said sealing blades are permanently biased against said boundary walls, thus assuring proper sealing and scraping contact during the entire turning movement of said charging flap.

8. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively, formed with a pair of grooves each located in one of said opposite side edges and extending substantially throughout the entire length thereof and having a rear face facing away from said charging space; sealing blades, each having a free edge portion; mounting means for mounting said sealing blades on said charging flap with said free edge portions of said sealing blades projecting beyond said side edges of said charging flap towards said boundary walls, said mounting means including a pair of elongated bars, respectively, fixed to said rear face of said charging flap adjacent said side edges thereof, each of said bars having an elongated projection extending laterally beyond the respective side edge of said flap; means for fastening said sealing blades to said projections of said bars, respectively, so that said free edge portions of said sealing blades are permanently biased against said boundary walls, thus assuring proper sealing and scraping contact during the entire turning movement of said charging flap; and a resilient, elongated packing member located in each of said grooves, respectively, substantially filling the same and extending outwardly beyond said side edge of said charging flap, resiliently pressing against said respective sealing blade thereby preventing passage of material between said respective sealing blade and the adjacent side edge of said charging flap.

9. In a kneader, in combination, wall means defining a charging space for the material to be worked; kneading means communicating with said charging space; boundary walls laterally bounding said charging space; a hinged charging flap movably arranged between said boundary walls and having opposite side edges located adjacent said boundary walls, respectively, formed with a pair of grooves each located in one of said opposite side edges and extending substantially throughout the entire length thereof and having a rear face facing away from said charging space; sealing blades, each having a free edge portion; mounting means for mounting said sealing blades on said charging flap with said free edge portions of said sealing blades projecting beyond said side edges of said charging flap towards said boundary walls, said mounting means including a pair of elongated bars, respectively, fixed to said rear face of said charging flap adjacent said side edges thereof, each of said bars having an elongated projection extending laterally beyond the respective side edge of said flap; means for fastening said sealing blades to said projections of said bars, respectively, so that said free edge portions of said sealing blades are permanently biased against said boundary walls, thus assuring proper sealing and scraping contact during the entire turning movement of said charging flap; and a resilient, elongated, tubular packing member located in each of said grooves, respectively, substantially filling the same and formed with an elongated lip extending outwardly beyond said side edge of said charging flap, said lip resiliently pressing against said respective sealing blade thereby preventing passage of material between said respective sealing blade and the adjacent side edge of said charging flap.

References Cited by the Examiner
UNITED STATES PATENTS

| | | | |
|---|---|---|---|
| 1,689,990 | 10/28 | Bandbury | 18—2 |
| 1,773,428 | 8/30 | Lewis | 18—2 |
| 2,914,788 | 12/59 | Smith et al. | 15—256.51 |

WILLIAM J. STEPHENSON, *Primary Examiner.*